Oct. 18, 1932.  J. M. HALL  1,882,831
SHOCK ABSORBER
Filed April 12, 1926  3 Sheets-Sheet 1
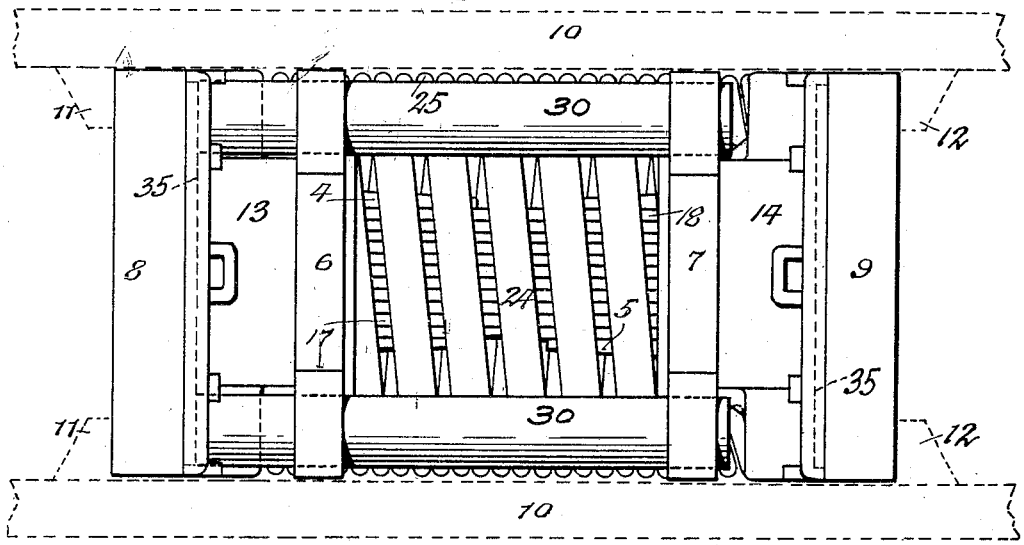
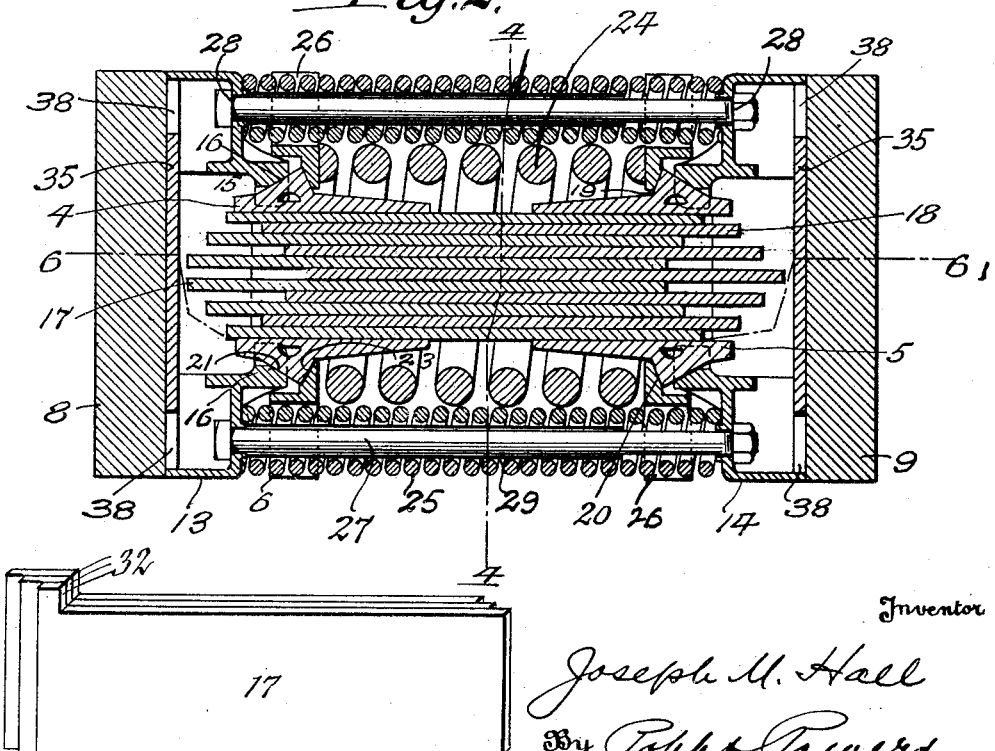
Inventor
Joseph M. Hall
By Popp & Powers
Attorneys Oct. 18, 1932.                J. M. HALL                1,882,831
                            SHOCK ABSORBER
                         Filed April 12, 1926           3 Sheets-Sheet 2
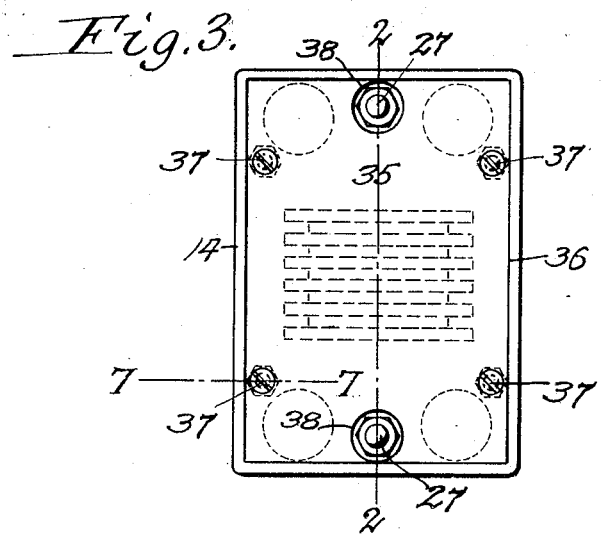
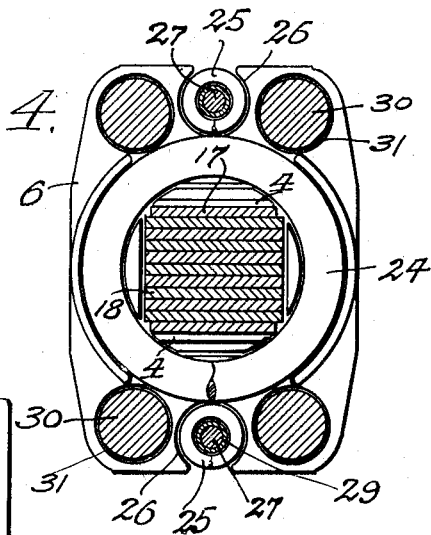
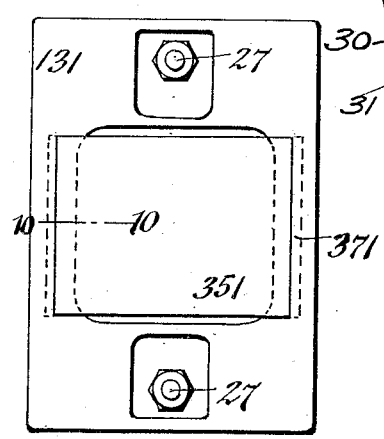
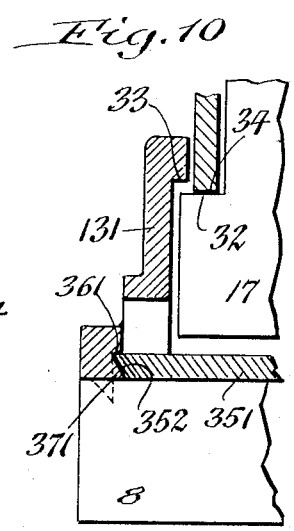
Inventor
Joseph M. Hall
By Popp & Powers
Attorneys Oct. 18, 1932.  J. M. HALL  1,882,831
SHOCK ABSORBER
Filed April 12, 1926   3 Sheets-Sheet 3

Inventor
Joseph M. Hall
By Popp & Powers
Attorneys

Patented Oct. 18, 1932

1,882,831

UNITED STATES PATENT OFFICE

JOSEPH M. HALL, OF HAMILTON, ONTARIO, CANADA, ASSIGNOR TO UNIVERSAL DRAFT GEAR ATTACHMENT CO., A CORPORATION OF ILLINOIS

SHOCK ABSORBER

Application filed April 12, 1926. Serial No. 101,366.

This invention relates to draft gears or shock absorbers and more particularly to a shock absorber of the type containing a plurality of sets of intercalated friction plates, means for moving said sets of plates lengthwise relatively to each other, and means for pressing said plates together transversely for increasing the friction contact between the same and the resistance effect while the sets of plates are moved longitudinally inward relatively to each other, and this transverse pressure is relieved when the longitudinal inward pressure is relaxed and thus permits of subsequently moving the sets of friction plates lengthwise outwardly relatively to each other with comparative freedom.

It has been found in actual practice with shock absorbers of this type that direct engagement of the followers with the ends of the friction plates causes the followers to wear unduly fast and also produces a sidewise deflecting pressure of the followers on the outer ends of the friction plates when the absorber comes into play while the cars are running on a curve in the roadway.

The purpose of this invention is to provide means for relieving the followers of undue wear and also preventing deflection of the outer ends of the friction plates so as to overcome the objectionable results above mentioned.

In the accompanying drawings:

Figure 1 is a plan view of a shock absorber embodying my improvements.

Figure 2 is a horizontal longitudinal section of the same taken in line 2—2, Fig. 3.

Figure 3 is an end elevation of the shock absorber.

Figure 4 is a vertical transverse section of the same taken on line 4—4, Fig. 2.

Figure 8 is a perspective view of a portion of one set of friction plates.

Figure 9 is an end elevation of the shock absorber showing a modified form of the means for holding the bearing plates on the main thrust head.

Figure 10 is a fragmetary longitudinal section taken on line 10—10, Fig. 9.

Similar characters of reference indicate like parts in the several figures of the drawings.

Figure 5:
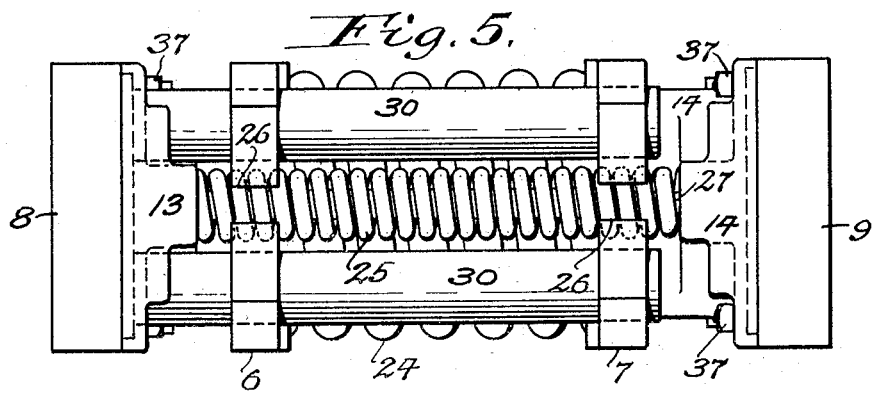
Figure 5 is a side view of the shock absorber.

It is customary in shock absorbers of this type to mount the same lengthwise between two main or outer followers 8, 9, which are arranged transversely relatively to the line of pulling and pushing or buffing strains to which the car is subjected when coupling adjacent cars or when drawing a train of cars. For this purpose these main followers together with the shock absorber between them, are mounted between longitudinal sills 10, 10 of the car frame and the outer sides of the followers engage with transverse stops 11, 11, 12, 12, on these sills.

It will be assumed that the follower 8 is at the front and the follower 9 at the rear of the absorber when the same is installed so that during a buffing action on the shock absorber the front follower 8 will be moved inwardly away from its stops 11, 11, while the rear follower 9 will be held stationary, and during a pulling action on the shock absorber the front follower 8 will remain at rest while the rear follower 9 is moved inwardly by the load upon the same.

In its general organization the shock absorber which embodies my improvements is constructed as follows:

The numeral 13, 14 represent outer or main thrust heads or casings which engage with their outer sides against the inner sides, respectively, of the front and rear followers and each of which is provided with a central opening 15 so that each of these heads has the form of a frame. On the opposite sides of the inner edge of the central opening of each outer thrust head the same has inclined faces 16, 16, which diverge inwardly, as shown in Fig. 2.

Between the sills are arranged two sets of intercalated friction plates 17, 18, which for convenience may be termed front and rear sets; the outer parts of the front set being arranged within the central opening of the front outer thrust head, and the rear parts of the friction plates being arranged within the central opening of the rear outer thrust head.

Adjacent to the inner sides of the outer thrust heads are two inner or auxiliary thrust heads 6, 7 each of which has a central opening 19 receiving the adjacent parts of the friction plates, and provided on opposite sides of its central opening with inclined faces 20, which diverge outwardly and are preferably arranged opposite the inclined faces 16 of the outer thrust heads, as shown in Fig. 2.

Arranged within the central openings of the thrust heads are friction wedge shoes or plates 4 and 5 a pair of which engage their inner flat longitudinal sides with the transversely opposite sides of the two sets of friction plates adjacent to one end thereof. On its outer longitudinal side each of the wedge shoes is provided with a transverse rib having an inclined outer face 21 engaging with the respective inclined face 16 of the adjacent outer thrust head and an inclined inner face 23 engaging with the respective inclined face 20 of the adjacent inner thrust head, it being understood that the outer inclined faces of each pair of wedge shoes converge outwardly and the inner inclined faces of the same converge inwardly.

The numeral 24 represents a main thrust spring which is preferably comparatively heavy and of helical form and surrounds the central parts of the friction plates and the inner ends of the wedge shoes and bears at its opposite ends against the inner sides of the inner thrust heads. Adjacent to outer diametrically opposite sides of the main thrust spring are two auxiliary release springs 25 which are of helical form and which pass with their end portions through side openings 26 in the inner thrust head and bear at their opposite ends against the inner sides of the two outer thrust heads, as shown in Figs. 2 and 5.

Undue separation of the outer thrust heads is prevented, when the gear is removed from the car, by tie rods 27 extending through the release springs and inner and outer thrust heads, and provided with inwardly facing shoulders 28 bearing against the outer sides of the outer thrust heads. Upon these tie rods and within the release springs are arranged retaining sleeves 29 which latter float on these rods and prevent these springs from buckling but are sufficiently short so as not to interfere with the required movement of the main thrust heads toward and from each other.

The closing movement of the shock absorber is limited by longitudinal over solid or stop rods 30 mounted loosely in side openings 31 in inner thrust heads and each adapted to engage at its opposite ends with the inner sides of the outer thrust heads.

Each of the friction plates has its outer end made wider than the inner end thereof whereby inwardly facing shoulders 32 are formed on opposite edges of each of these plates which are adapted to be engaged by outwardly facing shoulders 33, 34, arranged respectively on the adjacent outer and inner thrust heads.

Figure 7:
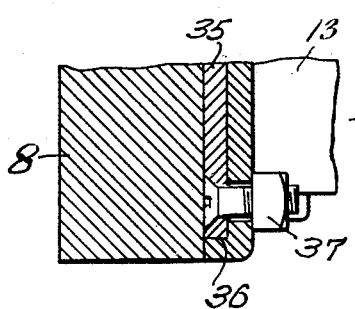
Figure 7 is a fragmentary horizontal section, on an enlarged scale, taken on line 7—7, Fig. 3.

Between the inner side of each main follower and the adjacent outer ends of one set of friction plates is arranged a bearing plate 35 which plate has its outer side flush with the outer side of the respective outer thrust head and secured within a recess 36 therein by any suitable means, for example by retaining bolts 37 connecting the same with the respective outer thrust head, as best shown in Fig. 7.

Each of these bearing plates is provided with openings 38 which are adapted to receive the heads and nuts at opposite ends of the tie rods and prevent interference therewith in the fully closed position of the absorber.

Figure 6:
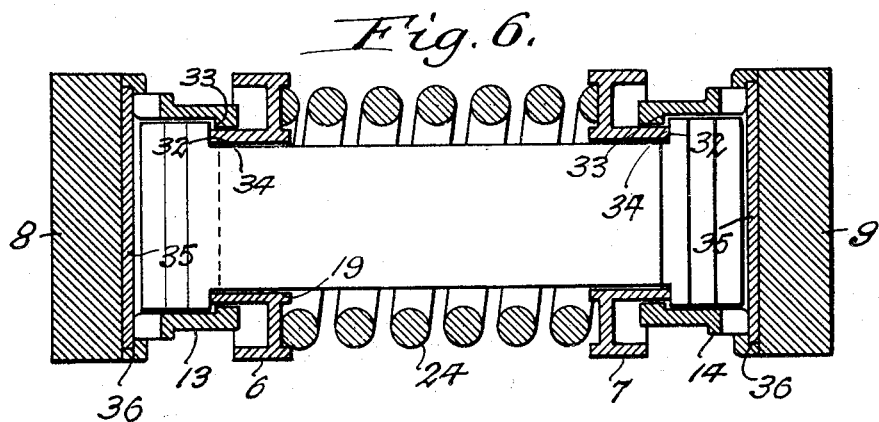
Figure 6 is a vertical longitudinal section of the same taken on line 6—6, Fig. 2.

The operation of the shock absorber is as follows:

Preparatory to placing the absorber in its operative position as part of the draft rigging between the front and rear stops of the car sills and connecting the same with the coupler yoke or similar actuating means, the springs of the absorber are put under an initial compression, as shown in Figs. 2 and 6, where the followers are represented in the maximum separated condition.

If a buffing or pulling force is applied to either of the followers 8, 9, sufficient to overcome the initial resistance of the draft gear caused by the initial compression on the springs which are the release springs 25 bearing direct on the thrust heads 13 and 14 and the frictional resistance set up by the action of the main thrust spring 24 wedging inward on the friction or wedge shoes 4 and 5, the friction or wedge shoes are caused to slide on the friction plates at both ends of the draft gear until the end bearing plates 35 are brought into engagement with the ends of the friction plates.

The forward movement of the moving follower and moving outer thrust head, and the wedge action due to the engagement of the inclined faces of the thrust heads with the outer inclines on the companion wedge shoes causes the latter to be pressed transversely inwardly causing increased frictional engagement of the several intercalated plates, and accordingly increasing the frictional resistance capacity of these plates against moving one set of these plates inwardly relative to the other set of plates. At the period of closing the draft gear the compression of the release springs 25 is increased as well as the compression of the main or thrust spring 24.

Immediately after the end bearing plates 35 are forced into contact with the ends of the friction plates, the intercalated friction plates are forced to slide inwardly, the set at one end being held stationary while the set at the other end is forced toward the stationary set, whereby the resistance to the sliding of the friction plates upon each other absorbs the shock or blow with increasing capacity due to the increasing wedging action set up by compressing the main spring 24.

When the load on the shock absorber is relieved to such an extent so as to allow the release springs 25 to force the outer thrust heads 13, 14, apart the action is as follows:

First, the release springs 25 separate the outer or main thrust heads 13, 14, which tends to relieve the wedging action on the shoes 4, 5. The pressure of the main spring 24 which is under compression forces the inner thrust heads or spring seats 6 and 7 against the shoes 4 and 5 tending to hold the latter in wedging engagement until the shoulders 34 are forced into contact with the shoulders 32 on the friction plates. The pressure of the main spring 24 is then divided between a wedging action on the friction or wedge shoes and a retractive action on the friction plates at which time the release springs 25 are tending to force the outer or main thrust heads 13, 14 away from the wedging action of the friction or wedge shoes.

The shoulders 33 on the main thrust heads 13 and 14 engage the shoulders 32 of the friction plates to arrest farther outward movements of the main thrust heads after sufficient outward movement is gained to fully relieve the wedging action and any excess capacity in the release springs 25 will be transferred to the friction plates so as to act upon them in the direction for assisting in retracting them to their outer position in which the gear is in release.

It has been found in practice that if the main followers are engaged directly with the outer ends of the friction plates that the inner sides of the followers are unevenly and that the outer ends of the friction plates are liable to be bent and also to slide imperfectly due to a lateral deflecting effect produced on these plates when the follower engages the friction plates at an angle as would be the case if the shock absorber goes into action while the cars are making a turn in the road.

These objections are overcome by the use of the bearing plates 35 which are interposed between the main followers or blocks and the opposite ends of the shock absorber. Inasmuch as these followers fit loosely in between the draft sills of the car there is a possibility of the follower being driven sidewise due to an angular blow received from the coupler butt. Since the bearing plates are seated on the outer thrust heads and are secured thereto, these bearing plates cannot move sidewise on the outer thrust heads, thus compelling these members to move sidewise together. This therefore removes the liability of the followers exerting a sidewise pressure against the friction plates and instead provide a definite bearing surface for engagement with the friction plates. Moreover the bearing plates supply extended bearing areas for the followers which in case of crosswise movement of the followers and friction plates operates to reduce wear on the followers and thus avoids the necessity of renewing the followers unduly frequently as would be the case if the followers engaged directly crosswise with the outer ends of the friction plates.

By making the bearing plates separate from the outer thrust heads and interposing the same between the followers and the friction plates it is possible to make the bearing plates of harder material than the followers and the same will therefore last longer. Instead of causing all of the friction plates to come into action simultaneously, means are provided whereby the plates of both intercalated sets come into action progressively while closing the gear and also while releasing the same. This may be accomplished in various ways but in the preferred construction the friction plates are all of the same length over all but the shoulders 32 are arranged on the friction plates at different distances from the ends thereof. For example on the three plates shown in Fig. 8 the plates are of the same length but the shoulders 32 thereon are arranged at three different distances from the outer ends of these plates. In the preferred arrangement the plates in the central parts of the two sets have their shoulders 32 arranged farthest from the outer ends of these plates and those plates progressively farther from the center of the two sets have their shoulders arranged nearer the outer ends of the respective friction plates. It follows from this construction that when the gear is closed either by a buffing or pulling action the bearing plates 35 which in effect form part of the main thrust heads and followers first engage with the outer ends of the friction plates whose shoulders 32 are farthest from the outer ends thereof, and their bearing plates 35 engage successively with the outer ends of the remaining friction plates which have their shoulders arranged progressively closer to the outer ends of these plates, thereby causing the moving plates to begin their inward movement successively and produce a progressive increase in the frictional resisting action of the same accordingly.

When the buffing or pulling action on the gear is released the retraction of the moving set of plates is likewise effected progressively because the shoulders 34 of the inner thrust head first engages those shoulders 32 which are farthest from the outer ends of same from certain friction plates and then successively engages those shoulders 32 which are progressively nearer the outer ends of the respective shoulders, thereby restoring the several friction plates to the outermost or fully retracted position in which their outer ends are arranged different distances from the inner side of the bearing plates, as shown in Fig. 2, preparatory to effecting a progressive starting in the movement of the movable plates during the next following closing of the gear.

In the form of construction shown on the drawings it will be noted that there are an even number of plates 17 in one set and an odd number of plates 18 in the other set. By means of this arrangement, when the gear is compressed the central plate 18 of the set at the right of Fig. 2 will be first moved until the plate 35 comes in contact with the end of the plate 18 at each side of the central plate, after which the two central plates 17 will move inwardly until they come in contact with the ends of the next two plates at the left of the figures, then the three plates at the right will be moved, thus picking up the plates progressively during the compression of the gear.

This arrangement eliminates the frictional resistance of all plates coming into action at the same period of time during the compression of the draft gear, likewise the friction plates are not all retracted at the same time in released action.

This gives a smooth graduated action in compression with a lower draft gear capacity so as to absorb light shocks with less disturbance, this being particularly desirable for passenger car service.

Instead of securing the bearing plates 35 to the outer thrust heads by means of bolts 37, as shown in Figs. 3 and 7, this may be accomplished in the manner shown in Figs. 9 and 10 in which case the bearing plate 351 rests with the marginal part of its inner side against a shoulder 361 on the outer side of the main thrust head 131 and the bearing plate is held in place by bending or swaging a retaining rim 371 from the position shown by dotted lines in Fig. 10, to the position shown by full lines in the same figure against a beveled edge 352 on the bearing plate and thereby connecting this plate and the respective thrust head so that the same are not liable to become detached when subjected to vibration while in service.

I claim as my invention:

1. A draft gear comprising a plurality of sets of intercalated friction plates, followers movable laterally relative to said plates and arranged at the outer ends of said plates, bearing plates interposed between the outer ends of said plates and the inner sides of said followers, and contacting said followers and the ends of said plates during the compression of the gear, means for preventing lateral movement of said bearing plates relative to said friction plates, and means for supporting said plates and impressing a lateral pressure on the same comprising outer thrust heads surrounding the ends of said friction plates and provided with recesses which receive said bearing plates, and means for connecting said bearing plates with said thrust heads.

2. A shock absorber comprising a pair of casings spaced apart, a plurality of sets of intercalated friction plates having their outer ends in said casings, follower plates at the outer ends of said casings and movable relative thereto, comparatively thin bearing plates between said follower plates and the ends of said friction plates and adapted to contact therewith during the compression of said shock absorber, means for securing said bearing plates to said casings, and means comprising wedging mechanism for forcing said friction plates laterally into frictional engagement with one another during the compression of the shock absorber.

3. A draft gear comprising a group of two sets of relatively movable intercalated friction plates, a follower at each end of said gear for engaging the outer ends of said sets of plates, respectively, during the compression of said gear, means including wedge elements at opposite sides of said group of plates at each end thereof for compressing said plates laterally inwardly when said gear is compressed, the plates of one set of said group being symmetrically arranged with relation to the central plate thereof, and the plates at each side of said central plate terminating a progressively greater distance from the corresponding follower than the central plate in their released position and the plates of the other set of said group being symmetrically arranged with respect to the two central plates, the plates at each side being progressively a greater distance from the follower than the two central plates in ther normal released position and means for restoring the parts to normal position upon the release of the gear after compression.

In testimony whereof I hereby affix my signature.

JOSEPH M. HALL.